United States Patent Office 2,792,814
Patented May 21, 1957

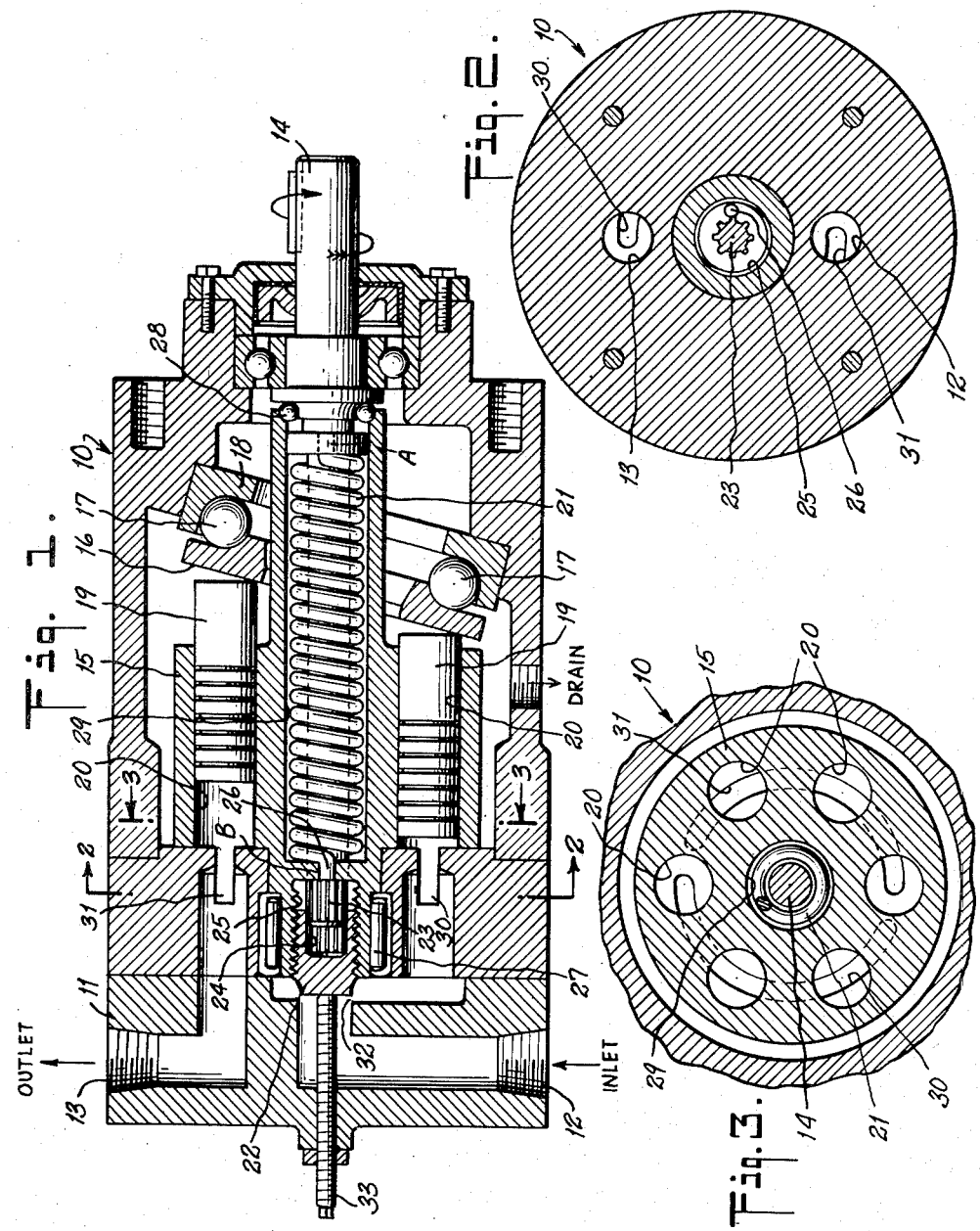

2,792,814

CONTROL OF FLUID MOTOR

Joseph C. Christophel, Montvale, N. J.

Application September 20, 1955, Serial No. 535,498

4 Claims. (Cl. 121—62)

This invention relates to a fluid motor which compensates for torque changes to provide a constant speed output.

Certain fluid motors are devised to produce an output at a constant rotational speed. These motors are driven by fluid pressure such as is supplied from a hydraulic pump. The motor produces a rotational output which provides a substantially constant speed under a constant load. This rotational output is employed to do conventional work that can be accomplished by a constant speed motor. In the exploitation of the power from a fluid motor, it is desirable to be able to vary the load on the motor output without causing a consequent variation in the output speed. Fluid motors cannot provide a compensation for an increase or decrease in load unless some control is provided to affect such compensation. This control must meet the change in load and maintain the output speed constant without an interruption of the motor operation and automatically upon the change of load.

It is an object of this invention to provide a means and method in a fluid motor for maintaining a constant output speed of the motor with a varying load demand.

It is a further object of this invention to provide a fluid motor of the positive displacement type having a constant fluid volume and having means and method for maintaining a constant output speed with a varying load demand.

Still another object of this invention is to provide a fluid motor having means for responding to a variation in torque demand which varies the pressure of the hydraulic fluid driving the motor, so as to compensate for the torque demand variation and maintain the motor output at a substantially constant speed.

These and other objects will become more apparent upon consideration of the following description taken together with the accompanying drawings, in which:

Figure 1 is an axial section of a fluid motor containing an embodiment of this invention;

Fig. 2 is a radial section of the fluid motor of Fig. 1 taken on line 2—2 in the direction of the arrows; and Fig. 3 is a radial section of the fluid motor of Fig. 1, taken on the line 3—3 in the direction of the arrows.

This invention, in brief summary, may be considered to comprise the connection and relationship between two rotatably driven parts of a fluid motor and the effect of the relationship on the supply of hydraulic pressure for driving the fluid motor. The invention provides two driven parts which are interconnected by an elastic member. Variations in torque demand on one of the rotatably driven parts of the motor are reflected by angular displacement between the rotating parts. The angular displacement is employed to produce valve control of the driving hydraulic pressure and consequently vary the pressure under the control of the variations in torque demand. Thus, the variations in torque demand may be counteracted by variations in hydraulic fluid pressure.

Referring specifically to the figures, in Fig. 1, we see a fluid motor. This motor is made up principally of a housing 10, which contains the rotatable parts of the motor. The housing 10 is provided at the left hand as shown in Fig. 1, with a block 11. The block 11 has an inlet port 12 and an outlet port 13. The housing 10 contains a main shaft 14, a rotatable cylinder block 15, and a bearing plate 16. The bearing plate 16 is rotatable and rides on ball bearings 17 which are seated in a race 18. The race 18 is mounted in the housing 10. The cylinder block 15 is provided with pistons 19 which bear against the bearing plate 16 and are reciprocable in cylinders 20 provided in the cylinder block 15.

The race 18 is fixed and stationary with the housing 10 and is mounted in the housing 10 at a non-perpendicular angle to the axis of rotation of the rotatable cylinder block 15. The plate 16, moving with the cylinder block 15, causes the pistons 19 to reciprocate in the cylinders 20 with the rotation of the cylinder block 15 and the bearing plate 16 around their coaxial axes. The main shaft 14 also rotates with the cylinder block 15 and is coaxial with the cylinder block 15 and the bearing plate 16.

The main shaft 14 is connected to the cylinder block 15 by two means each of which allows the main shaft to be relatively rotatable with relation to the cylinder block 15 to a limited degree and thus provide an interconnection between the main shaft 14 and the cylinder block 15. This connection is provided by a torsion spring 21 and a threaded valve head 22. The torsion spring 21 is anchored at one end in the main shaft 14 and the other end in the cylinder block 15. The anchorage in the main shaft is indicated at A and the anchorage in the cylinder block is indicated at B. The main shaft 14 terminates in a spline 23 which engages a recess 24 in the valve head 22. The valve head 22 is mounted in a recess 25 in the cylinder block 15 which is threaded in a direction counter to the direction of rotation of the shaft 14. Consequently, relative motion between the main shaft 14 and the cylinder block 15 will result in axial threading of the valve head 22 in the recess 25.

Referring to Fig. 2, the inlet port 12 and the outlet port 13 are shown in the block 11. Also shown are the spline 23 and the threaded recess 25. A dog 26 at the end of the spring 21 is also shown. This dog 26 seats in the cylinder block 15.

The cylinder block 15 rides in the block 11 on needle bearings 27 and on the main shaft 14 on bearings 28 to provide relative motion between the block 15 and the main shaft 14.

In Fig. 3 there is shown the cylinders 20 in the cylinder block 15 with an axial passage 29 through which the shaft 14 extends surrounded by the torsion spring 21. The cylinders 20 are connected in two sets by an inlet manifold 30 and an outlet manifold 31. These manifolds connect to respective ports 12 and 13 providing the means for passing the hydraulic fluid through the motor and for driving the rotatable shaft 14 and cylinder block 15.

In the operation of the device of this invention, fluid motor is driven at a constant speed by the introduction of hydraulic fluid through the inlet port 12 to the inlet manifold 30 and through the inlet manifold 30 to cylinders 20. At the point of the entrance of fluid pressure which is on the far side of the motor, as shown in Fig. 1, the pistons 19 are in an inner position in their respective cylinders 20. The fluid under pressure when forced into the cylinders 20 then tends to force the pistons out of the cylinder. This results in the bearing of the opposite end of the respective piston against the inclined bearing plate 16 and causes it to turn on its bearings 17 and assume the position shown for the pistons 19 in the upper half of the motor. Thus, the pressure of the fluid in the cylinders 20 causes the cylinder block 15 and the bearing plate 16 to rotate as the cylinders revolve, all around the common axis. When the pistons 19 have been forced out to the outermost position with respect to the cylinder block 15, the cylinders 20 come into communication with the outlet manifold 31 at which time the pistons move inward under the influence of the inclined plate 16, the fluid is forced from the cylinders 20 and into the outlet port 12 through the outlet manifold 31. It will thus be seen that a continued flow from the inlet port 12 to the outlet port 13 will cause continuous rotation of the cylinder block 15, the main shaft 14 and their component parts.

An orifice 32 in the inlet port 12 is variably restricted by the axial motion of the valve head 22. A set screw 33 is provided for limiting the closing action of the valve head 22 in the orifice 32. The axial movement of the valve head 22 increases and decreases the pressure of the fluid flowing to the cylinder block 15 and its cylinders 20. This increase and decrease in the pressure is adjusted to compensate for changes in torque demand on the main shaft 14. As a result of a load demand increase on shaft 14, the torsion spring 21 will deflect further radially as it carries the increased load which, in turn, will allow radial displacement between shaft 14 and the cylinder block 15. The degree of radial displacement between shaft 14 and cylinder block 15 is a function of the percentage of increased torque demand on shaft 14 and on torsion spring 21, which is calculated to deflect a predetermined number of degrees under a given radial load. When this increased torque demand on shaft 14 is matched by radial deflection in the torsion spring 21 the valve head 22 will show the same relative radial displacement with respect to cylinder block 15, as the spring 21. It thus will be seen that any radial displacement between valve head 22 and cylinder block 15 will result in axial movement of the valve head 22 with respect to cylinder block 15. As the shaft rotates in the direction indicated, a left hand thread on the valve head 22 will cause it to move away from end plate 11 increasing orifice 32 and thereby affecting the fluid pressure in direct proportion to the increased load demand.

The valve opening at passage 32 is preset to provide sufficient fluid pressure to meet the minimum load requirement at a given speed. When the torque load on the output shaft 14 increases beyond the minimum requirement setting of the valve 12, the torsion spring connecting the main shaft and the cylinder block will flex to permit relative motion. This flexing between the two members permits relative motion between them. This relative motion is reciprocated in axial movement of the valve head 22, which is connected to the end of the shaft 14 by means of spline 23 and is threaded in the cylinder block 15. As the elasticity of the torque spring approaches a balance with the change in load, it will either open or close orifice 32 and increase or decrease the fluid pressure to compensate for the increased or decreased torque demand. The valve head 22 is engaged by a machine thread in the cylinder block 15. The cylinder block on the other hand is driven with the main shaft 14 by means of the torsion spring 21. When the torsion spring is wound or unwound to its restricted limit, the cylinder block 15 and the main shaft 14 become fixed with relation to one another as if they were directly fastened to each other and no further relative motion will be obtained between the parts. Accordingly, the axial movement of the valve head 22 is limited to a maximum spring deflection. The maximum spring deflection in torsion is indicative of a maximum adjustment of the motor output to torque variations. The amount of adjustment or absorption of torque variation permitted in any given fluid motor will vary in accordance with the characteristics of the torsion spring which connects the main shaft and the cylinder block. The wider the separation of the elastic limits of winding and unwinding of the torsion spring, the greater will be the possible compensation of variations in torque demand.

The above described embodiment of this invention is presented for the purpose of illustration. It will be readily understood that modifications in the described structure may be made. The invention is shown as applied to one type of fluid motor. It may be incorporated in other fluid motors in which angular movement is possible between respective parts of the driving mechanism.

The advantages of the device of this invention are the advantages obtained from providing a fluid motor which can maintain a constant output speed with a varying load demand. This device may be used wherever pressure regulation is desired for controlling hydraulic pressure used in driving an output shaft upon which variations in load are impressed.

It is intended that the scope of the invention be limited only by the appended claims.

What is claimed is:

1. In a fluid motor, a power shaft, means driven by fluid pressure for providing rotational motion to said power shaft and rotating therewith, valve means mounted in said first means for varying fluid pressure to said first means, a torsionally elastic member attached between said power shaft and said rotatable means permitting limited angular displacement therebetween and axial displacement of said valve means, a fluid power supply means providing said fluid pressure and a flow of fluid from said supply means.

2. In a control for a fluid-driven motor, a rotatable cylinder block, pistons in said cylinder block driven by a fluid to rotate said cylinder block, said fluid being supplied into said cylinder block and into engagement with said pistons under pressure, a rotatable main shaft rotatably mounted in and extending through said cylinder block, a torsion spring engaging said cylinder block and said main shaft to limit angular displacement between said block and shaft, and valve means mounted in said block for controlling said fluid, an end of said spring anchored in said valve means, said valve means being movable axially in said block to control said fluid whereby relative angular movement between said cylinder block and said shaft actuates said valve means to vary said fluid supply.

3. In a control for a fluid motor, a rotatable cylinder block, a casing containing said rotatable cylinder block, a main shaft mounted and rotatable in said casing positioned axially of said cylinder block, a torsion spring connecting said main shaft to said cylinder block having a first end mounted in said shaft and a second end in said cylinder block, and a threaded valve head threadedly mounted in said cylinder block, the second end of said torsion spring being mounted in said valve head.

4. In a fluid motor, a housing, a rotatable cylinder block rotatably mounted in said housing, reciprocable pistons driven by fluid pressure mounted in said cylinder block to rotate said block, a main shaft rotatably mounted in said housing and connected to said block, said shaft being driven by rotation of said cylinder block, a torsion spring connecting said shaft to said cylinder block, a first end of said torsion spring connected to said cylinder block, a second end of said torsion spring connected to said shaft, a threaded valve head, and means for supplying fluid pressure to said cylinder block and said pistons, said threaded valve head being threaded in said cylinder block in opposite rotation to the rotation of said shaft and the amount of relative rotation between said shaft and said cylinder block being limited by said torsion spring.

References Cited in the file of this patent

UNITED STATES PATENTS 403,150    Shawhan _____ May 14, 1889